(No Model.)  3 Sheets—Sheet 1.

G. D. HAWORTH.
SEED PLANTER.

No. 283,780.  Patented Aug. 28, 1883.

WITNESSES
F. L. Durand
Rex Smith

INVENTOR
Geo. D. Haworth
by A. M. Smith
Attorney

N. PETERS. Photo-Lithographer, Washington, D. C.

(No Model.) 3 Sheets—Sheet 2.
G. D. HAWORTH.
SEED PLANTER.
No. 283,780. Patented Aug. 28, 1883.
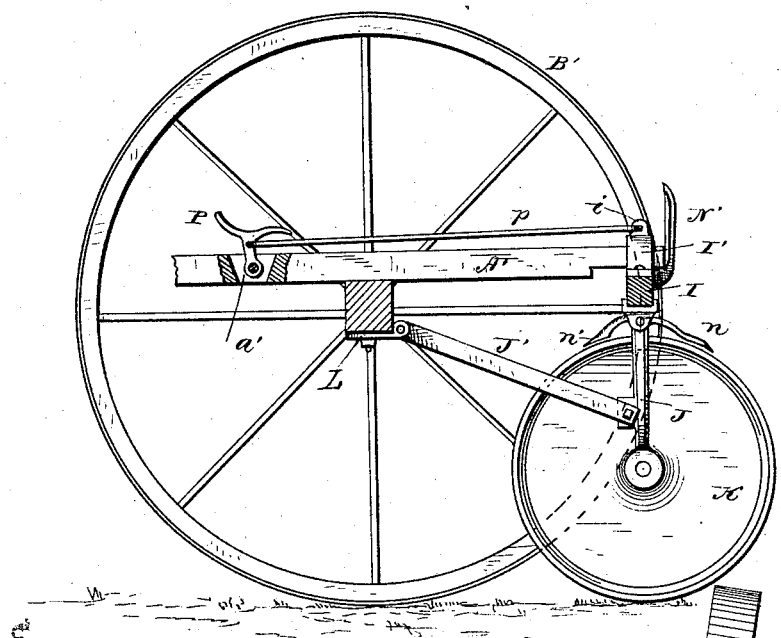
Fig. 2.
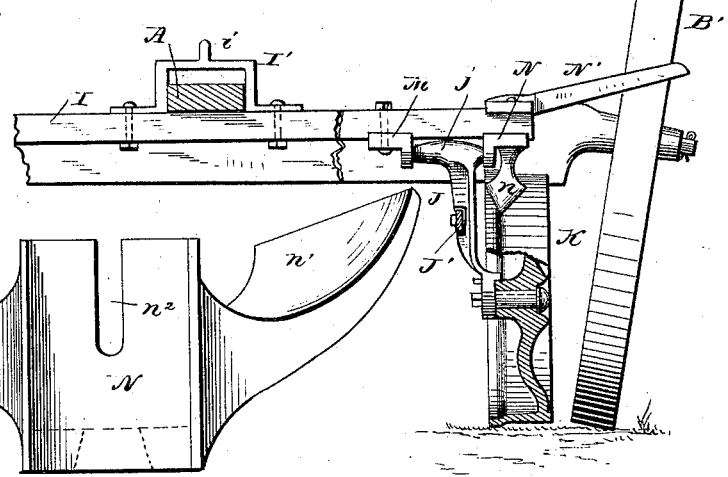
Fig. 3.
Fig. 8.
WITNESSES
F. L. Durand
Rex Smith
INVENTOR
Geo. D. Haworth
by A. M. Smith
Attorney.

(No Model.) 3 Sheets—Sheet 3.

G. D. HAWORTH.
SEED PLANTER.

No. 283,780. Patented Aug. 28, 1883.

WITNESSES
F. L. Durand
Rex Smith

INVENTOR
Geo. D. Haworth
by A. M. Smith
Attorney

UNITED STATES PATENT OFFICE.

GEORGE D. HAWORTH, OF DECATUR, ILLINOIS.

SEED-PLANTER.

SPECIFICATION forming part of Letters Patent No. 283,780, dated August 28, 1883.

Application filed March 23, 1883. (No model.)

*To all whom it may concern:*

Be it known that I, GEORGE D. HAWORTH, of Decatur, county of Macon, and State of Illinois, have invented a new and useful Improvement in Seed-Planters, of which the following is a full, clear, and exact description, reference being had to the accompanying drawings, making part of this specification.

My invention relates to a novel construction and arrangement of scrapers for cleaning the carrying and covering wheels; to the manner of combining said wheels with the axle and said scraper-bars; to the combination, with the main and covering wheel frame and the seeder-frame hinged thereto, of a pivoted dog for locking said frames in position for transportation or movement from place to place, and to the manner of connecting the seat with the pivoted seat and fulcrum standards, whereby the adjustment of the truck and planter frames relatively to each other and the holding of said frames at the desired adjustment is facilitated, and to certain details of construction and arrangement, all as hereinafter explained.

Figure 1:
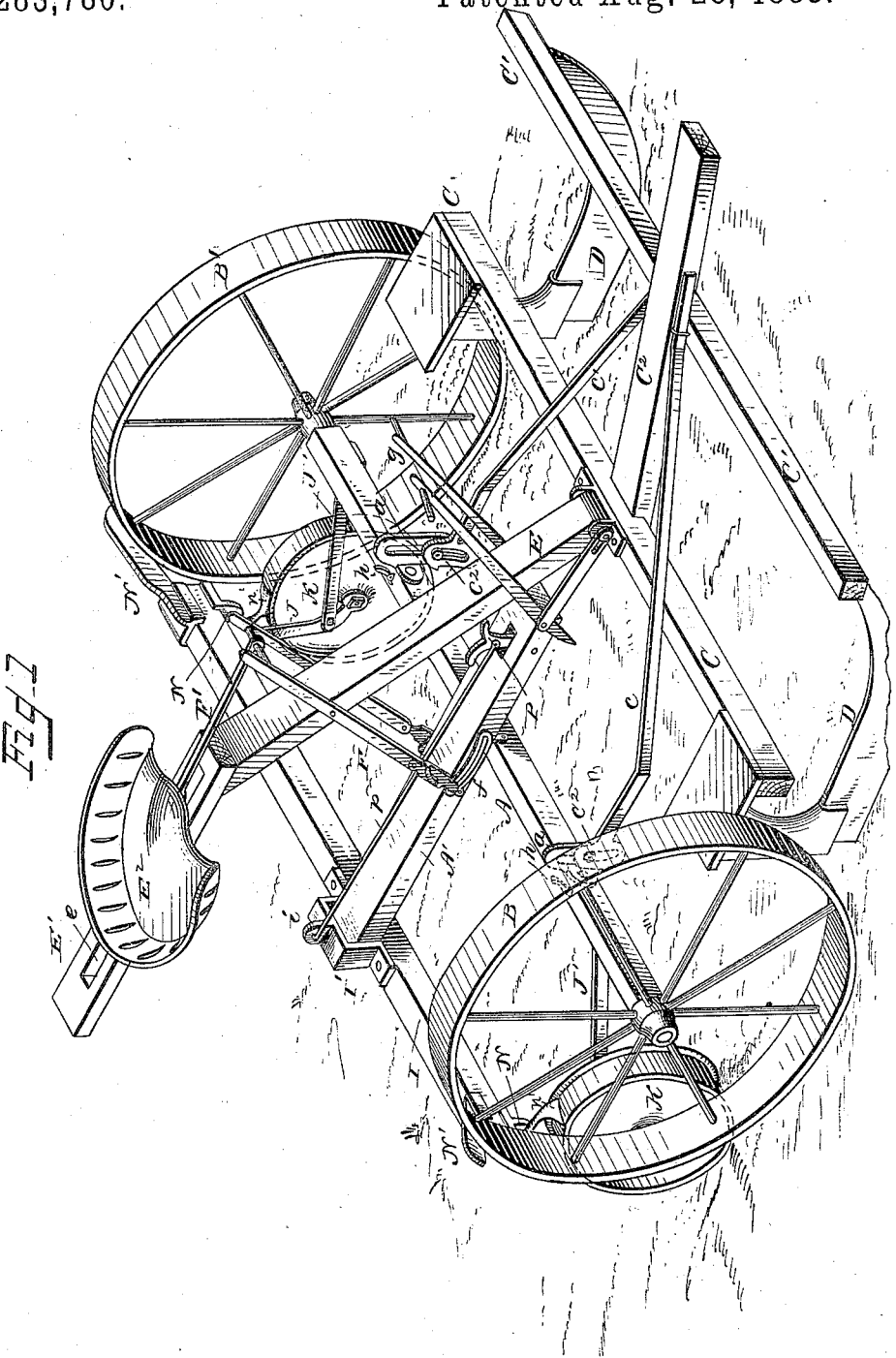
Figure 4:
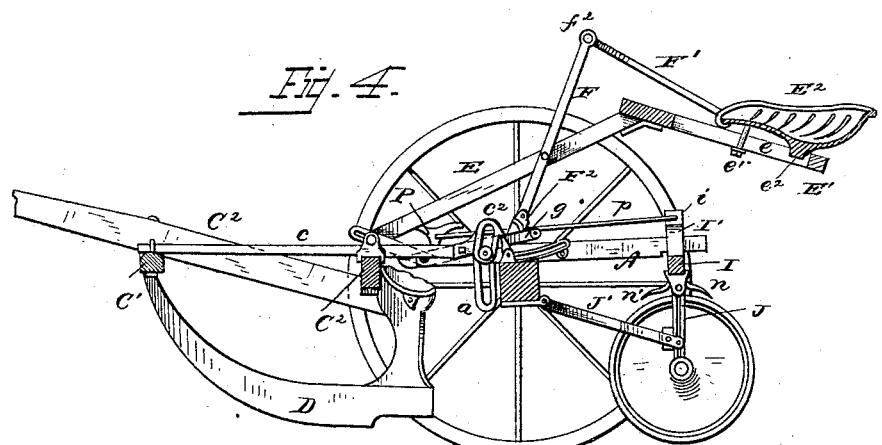
Figure 5:
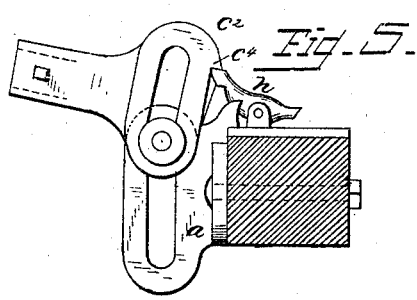
Figure 6:
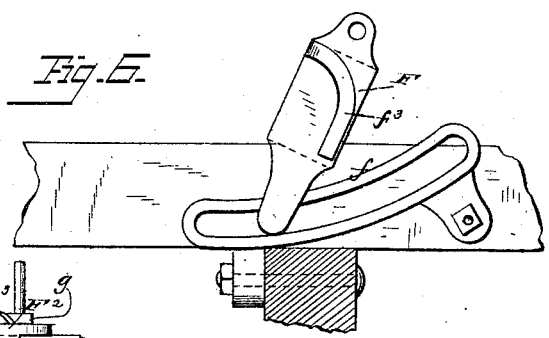
Figure 7:
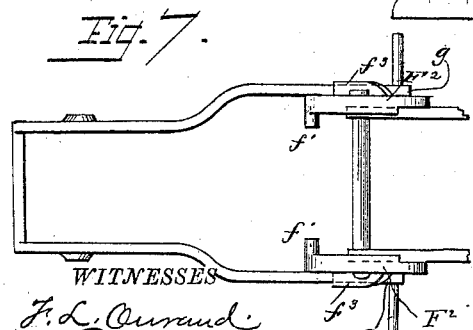

In the accompanying drawings, Figure 1 is a perspective view of so much of a seed-planter as is necessary to show my improvements. Fig. 2 represents a longitudinal section through the main carrying and covering wheel frame. Fig. 3 represents a rear elevation of a portion of the same, partly in section. Fig. 4 represents a longitudinal section through the machine. Fig. 5 shows the joint between the seeding and covering wheel frames and the pivoted dog in side elevation. Fig. 6 is a side elevation of one of the grooved segments on the covering-wheel frame and the flanged plate connecting the seat fulcrum-standard therewith. Fig. 7 is a view of the fulcrum-standard and foot-lever detached, and Fig. 8 is a plan view of one of the double scraper plates or irons detached.

The machine represented in the drawings is similar in its organization or general arrangement of parts to that described in Letters Patent granted to me August 29, 1882, and will therefore not be described in detail, further than is necessary to an understanding of my present improvements.

A represents the axle-bar of the truck or carrying and covering wheel frame; A', the longitudinal frame-bar rigidly connected with the axle-bar, and B B' the main carrying-wheels, said wheels being mounted on suitable journals on the axle-bar, and serving also as the forward covering-wheels.

C and C' are the transverse bars of the seeder-frame, to which the runners or shoes D are connected, and which are also connected by the longitudinal bar $C^2$, which may be extended to form the pole or tongue of the machine, or to which the latter may be connected. $c$ and $c'$ are diverging hounds or draft-rods, connected at their forward ends with the tongue or tongue-bar $C^2$, and provided at their rear ends with vertically-slotted yokes or ears $c^2$, through which they are connected by roller-pins with similar ears, $a$, on the axle-bar.

E is the seat-standard, pivoted at its forward lower end to the rear transverse bar, C, of the seeder-frame, and upheld in the desired position for supporting the seat by means of a fulcrum-bar or double standard, F, pivoted to the seat-standard E, and adjustably connected at its lower end, through grooved segments $f$, with the frame-bar A', the above parts being similar in form and arrangement to the corresponding parts described in my patent referred to. The upper end of the seat-standard E has the forward end of a horizontal bar, E', rigidly connected with it, forming the support for the seat $E^2$, and provided with a vertical longitudinal slot, $e$, through which the seat is connected by a bolt or pin, $e'$, permitting a longitudinal adjustment or sliding movement of the seat on the bar E, a spur or pin, $e^2$, on the lower face of the seat entering the slot $e$, and serving to guide and steady the movements of the seat. The seat is connected by a link, F', with the upper end of the fulcrum-standard F in such manner that when the latter is vibrated the seat will be moved forward or backward with it, for moving the weight of the driver forward, for holding the shoes or runners D of the seeder-frame, and the covering-wheels of the truck-frame down to their work, and backward for giving increased leverage for holding the runners and rear or small covering-wheels up, for moving the machine from place to place, in a manner similar to that described in my patent referred to, except in the addition of the adjustable seat and the connection of the latter with the fulcrum-standard above described. The double standard F has the lower ends of its parallel bars secured in sockets in flanged plates $F^2$, (see Figs. 6 and 7,) provided on the lower ends with inwardly-projecting pins or spurs $f'$, which enter the grooves in the segments $f$, and on their outer faces with curved wedge-shaped ribs $f^2$, which allow the arms of the foot-lever G to pass by them when the frames are being lifted, as shown in Fig. 4, for moving the machine from place to place, and which serve as stops to lock and prevent the return of said arms until they are released by the attendant by the forward vibration of the fulcrum-standard for depressing the frames into working position.

The slotted yokes or eyes $c^2$, through which the rear ends of the hounds or braces $c\ c'$ are connected with the slotted brackets $a$ on the axle-bar, are provided with rearwardly-projecting cams or lips $c^4$, square-shouldered on their lower faces and rounded or inclined on their upper faces, and upon the axle-bar A dogs $h$, are pivoted, weighted on their forward or pawl ends, and adapted to ride upward on the cam-faces of the lips $c^4$, and to drop into engagement with the shouldered faces, as shown in Fig. 5, for holding or locking the frames with the seeding-shoes and covering-rollers elevated for transportation, as shown in Fig. 4. The dogs $h$ have each a heel-extension in rear of its pivot, forming a treadle, adapting it to be released by the pressure of the driver's foot.

The longitudinal frame-bar A', at its rear end, passes through a loop-standard, I', secured rigidly to a transverse scraper-bar, I, to the ends of which the covering-wheel standards J are pivoted, at their upper ends, said standards being provided at their lower ends with journals for the rear covering-wheels, K, in a manner described in a former patent granted to me. The standards J have sockets formed in them at or near the center of their length, and to each in said socket is rigidly secured the rear end of a draw-bar, J', which at is forward end is pivoted in a bracket, L, secured to the axle-bar A, or other suitable point of support. The upper end of the standard J has a cross-head, $j$, formed upon it, the ends of which are rounded, forming journals or pivots, which enter eyes or sockets in brackets M and N, secured to the lower face of the bar I. The bracket N is by preference made in one piece with the scrapers $n$ and $n'$, the former, $n$, made in the form of a spear-head, overhanging the face of the wheel in rear of the bar I, and of a width about equal to one half of the width, from side to side, of said face of the wheel, and the latter, $n'$, extending in front of the bar I, and provided with an inclined scraping-edge reaching over or overhanging the other half, in width, of the face of the wheel K. In other words, the scrapers $n$ and $n'$ are adapted each to scrape about one-half the face of the wheel, and, being connected with the pivoted bar I, are brought alternately into action, by the rocking of the latter on its pivotal connection $j$, with the standards J.

To the upper face of the bar I, at its ends, are secured scrapers N', which project outward across the face of the main carrying and covering wheels B B', and which, when the bar I is rocked forward for throwing the scrapers $n'$ down on the smaller wheels, K, are thrown forward against said wheels and serve to scrape the adhering soil therefrom. By the arrangement of the scrapers $n$ and $n'$, whereby they are adapted to reach over and to scrape each only about one-half the surface of the wheels K, acting alternately, the frictional resistance to the rotation of said wheels is greatly reduced, as compared with the scraper which scrapes the entire surface of the wheel at a single operation, and this is important where, as in the present construction, the frictional grasp of the wheel on the ground for producing rotation of the wheel is due mainly to the gravity of the wheel itself. The yoke-standard I', through which the rear end of the frame-bar A' passes loosely, as explained, is of sufficient height to accommodate this rocking movement of the bar I, and is provided on its upper face with a short standard, $i$, from which a rod, $p$, extends forward, and is pivoted at its forward end to a foot lever or treadle, P, pivoted in the bar A' in a slot formed at $a'$ in the forward end of said bar, or in any other suitable support within convenient reach of the foot of the driver in his seat $E^2$.

By rocking the bar I in one direction the driver can throw the rear scrapers, $n$, into action for scraping one half of the faces of the wheels K; or by rocking it in the opposite direction the scrapers $n$ and N' can be thrown into action, the former for scraping the other half of the wheels K and the latter for scraping the wheels B B'.

The scraper-brackets N are socketed on their upper faces to receive the bar I, and are provided with longitudinal slots $n^2$, through which they are connected, by through-bolts, with the ends of said bar, said slots permitting the lateral adjustment of the scrapers for bringing them into proper relation to the wheels K, and the scrapers N' may be connected in a similar manner with the upper face of said bar I, for permitting their adjustment, if desired.

It will be apparent that the form of the scrapers of the treadle for actuating or rocking said scrapers, and of the other devices hereinabove specifically described, may be varied without departing from my invention.

Having now described my invention, what I claim as new—

1. The rocking bar to which the scrapers are attached, pivoted to the upper ends of the covering-wheel standards, substantially as described.

2. The rocking bar to which the scrapers are attached, pivoted to the wheel-standards, in combination with mechanism controlled by the driver in his seat, for rocking said bar and scrapers, substantially as described.

3. The combination, with the covering-wheels, of the rocking bar provided with scrapers $n$ and $n'$, adapted each to scrape less than the entire surface of the wheel, substantially as and for the purpose described.

4. The combination, with the carrying and covering wheels, of the rocking transverse bar provided with scrapers for scraping the faces or peripheries of said wheels, substantially as described.

5. The plate or bracket N, provided with the scrapers $n$ and $n'$, the slot permitting its adjustment on the bar I, and a bearing for the pivot connecting said bar with the covering-wheel standard, substantially as described.

6. The covering-wheel standards, rigidly connected with draw-bars hinged to the main frame or axle-bar, and provided with the pivotal cross-heads, in combination with the rocking bar to which the scrapers are attached, pivoted to said standard, substantially as described.

7. The main wheel or truck frame and the seeder-frame, connected by means of the slotted ears or brackets and the pivotal pin, in combination with the pivoted dog or dogs, for locking said ears when the seeding and covering devices are elevated for transportation, substantially as described.

8. The combination of the driver's seat, adapted to slide on its support, with the shifting fulcrum-standard upholding the pivotal seat-standard, substantially as described, whereby the weight of the driver is moved backward or forward by the adjustment of said fulcrum-standard, for the purpose specified.

In testimony whereof I have hereunto set my hand.

GEORGE D. HAWORTH.

Witnesses:
 THEO. COLEMAN,
 C. O. JUDSON.